United States Patent Office 3,025,844
Patented Mar. 20, 1962

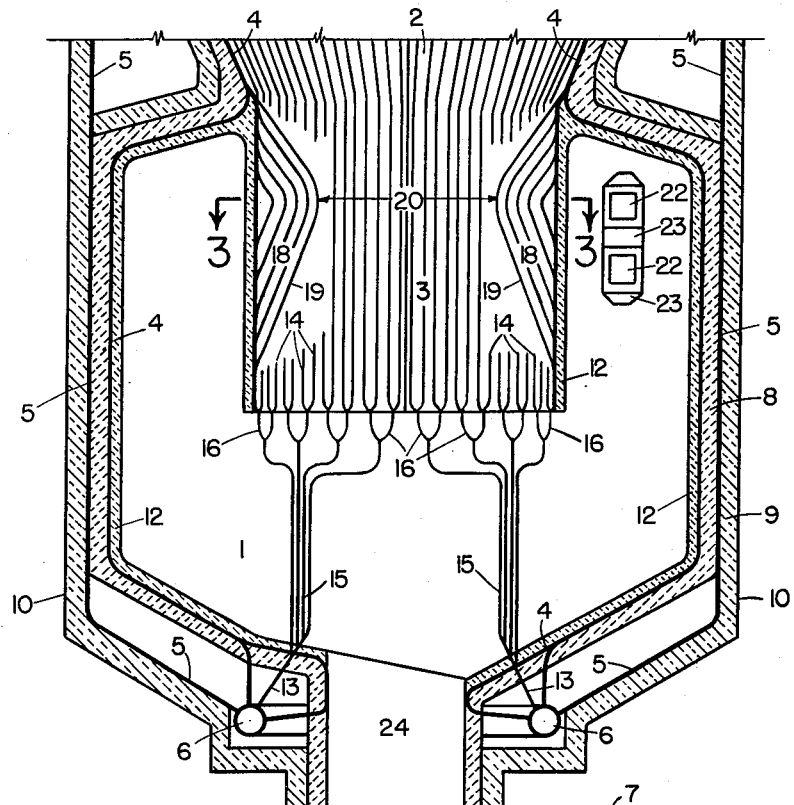
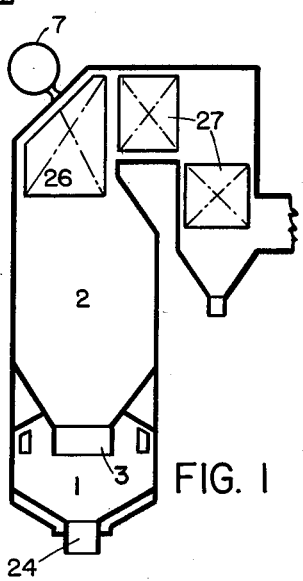
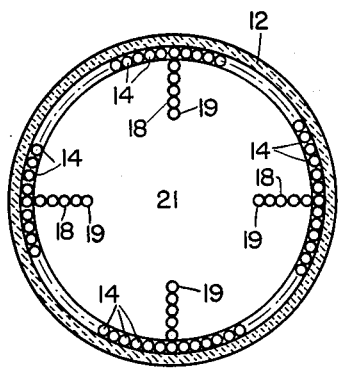
FIG. 2
FIG. 1
FIG. 3
INVENTOR
THEODOR GEISSLER
ATTORNEY

3,025,844
RADIANT TUBULAR BOILER
Theodor Geissler, Stuttgart, Germany, assignor to Kohlenscheidungs-Gesellschaft m.b.H., a corporation of Germany
Filed Mar. 23, 1955, Ser. No. 496,299
4 Claims. (Cl. 122—235)

This invention relates to a radiant steam generator of a thermal power plant being fired with ash forming fuel and discharging the ash in a fluid state. The invention is particularly concerned with a steam generator in which finely divided fuel such as pulverized coal and air is blown into the furnace tangentially to one or more imaginary firing circles positioned within the furnace chamber.

A power plant of this type generally comprises a combustion chamber provided with a central gas outlet, similar to that of a cyclone separator, through which the furnace gases escape and pass into a second chamber, the so-called radiant furnace chamber. In this radiant furnace chamber the temperature of the combustion gases is cooled below the fusion point of the ash. The ashes carried in the combustion gases therefore solidify and have a lesser tendency to adhere to the convection heating surfaces located in the upper portion of the radiant furnace chamber or in gas passages beyond.

In furnaces of the above type most of the ash is removed from the gases within the cyclonic combustion chamber by centrifugal force and in a molten state. This is accomplished by maintaining the temperature of the gases while passing through the combustion chamber considerably above the fusion point of the ash. The separation of the ashes in fluid form has the additional advantage of encouraging the forming of ash conglomerations which by virtue of a larger mass are easily separated from the bases by centrifugal force and are thrown against the walls of the combustion chamber. The molten ash runs down these walls and flows out through an opening in the combustion chamber floor.

It has been found in the operation of furnaces of this type that the ash thrown out of the gases near the mouth of the axial gas outlet, instead of flowing downwardly by gravity, is pulled upwardly through the outlet throat of the chamber by the high velocity of the rotating gas stream. By gradually creeping upwardly into the lower portion of the radiant chamber these molten ashes reach a region where the temperature drops to a point below the fusion point, causing the ashes to solidify, adhere to and build up on the lower walls of the radiant furnace chamber. These accumulated ash deposits by reducing the heat transfer efficiency of the wall surfaces interfere with the proper operation of the unit. This of course makes it necessary to periodically shut down the unit for cleaning purposes, a costly and time consuming operation.

A considerable improvement of this condition has been achieved by providing the gas outlet throat of the cyclonic combustion chamber with radially extending tubular wall surfaces. These walls change the direction of the rotating gases and cause them to approach a flow path which is an upwardly longitudinal direction. The wet ash particles are accordingly carried upwardly into a higher and cooler portion of the radiant furnace chamber where these particles solidify without coming in contact with the chamber walls. These solid ash particles then will be carried out of the furnace by the gases without slagging up the convection heating surfaces or forming deposits on the lower portion of the radiant furnace chamber walls.

These radial walls previously have been built extending from the inner periphery of the gas outlet throat to the axial center thereof. However the draft loss becomes exceedingly high in a cyclone furnace equipped with radial walls that thus form continuous surfaces inside the gas outlet duct. This is due to the sudden arresting of rotational forces in the gas stream in an effort to change the direction of flow.

In accordance with the invention a considerable improvement of the above condition is brought about by forming these radial walls in such a manner that the radial surface advance progressively from a point at the periphery of the gas outlet towards the axis of and in direction of gas flow.

It is accordingly a main object of the invention to provide radial wall or guiding vanes inside the axial gas discharge duct of the cyclone chamber which permit conversion of the rotational gas flow to axial gas flow without excessive draft loss caused by shock.

Other and further objects of the invention will become apparent to those skilled in the art from the detailed description thereof when taken in conjunction with the accompanying drawings wherein:

FIGURE 1 is a diagrammatic representation of a steam generator having a cyclone furnace equipped with our inventive improvement.

FIGURE 2 is an enlarged longitudinal sectional view of the cyclone furnace chamber including an adjoining portion of the radiant chamber.

FIGURE 3 is a horizontal cross section above the gas outlet duct of the cyclone chamber taken on line 3—3 and showing the radially extending guide walls.

The steam generator illustrated in FIGS. 1 and 2 is of the natural circulation type and comprises a circular combustion and slagging chamber 1 which communictes with a radiant chamber 2 by way of a gas outlet duct 3 also of circular cross section. Combustion chamber 1 is lined with water cooled tubes 4 rising from ring header 6. This header receives water by way of down comers 5 from drum 7. Tubes 4 form a constriction in the roof of chamber 1 and continue upwardly to form the water cooled lining of chamber 2. Steam and water from tubes 4 is discharged into drum 7. Tubes 4 and 5 are surrounded by insulating material 8 and 9 and a casing 10. On their heat exposed side tubes 4 are covered with refractory material 12.

The outlet duct 3 is formed and cooled by tubes 13 and 14 which also originate in and are fed from header 6. These tubes are gathered into one or several bundles 15 while transversing the lower portion of the slagging chamber 1 in an axial direction. At their upper ends tubes 15 are formed into bifurcates 16, each end of bifurcate 16 in turn being bifurcated to form tubes 14 which line the inner surface of axial gas outlet 3 and extend in an upward direction to join tubes 4 in lining the wall of upper chamber 2. Outlet duct 3 is also covered on the outside with a layer of refractory 12. A predetermined number of tubes 14 are utilized to form radially extending tubular walls 18. These walls are arranged in spaced relation around the inner periphery of gas outlet duct 3.

In accordance with the invention these radial walls 18 are equipped with an outer edge 19 which progressively approaches the vertical axis of outlet duct 3 up to a predetermined distance 20 and in direction of gas flow, so that an open area 21 remains in the center of the gas outlet 3. The geometric form of radial walls 18 can be either that of a triangle or can be provided with a more curved shape having corners more or less rounded off.

Fuel such as pulverized coal with combustion air enter under pressure through burner openings 22 and air openings 23 respectively in a direction which preferably is tangential to an imaginary firing circle. Combustion takes place in a gas stream which assumes a spiral rotational motion, first downwardly and then upwardly, through gas outlet 3. The rotational movement of these gases is arrested by radial walls 18 in a manner which is gradual and without sudden and abrupt action, assuring a minimum of draft loss across gas outlet duct 3. The rotational motion of the gases is thereby progressively converted into an axial movement of the gases without excessive pressure loss.

Because of the high temperature of the combustion gases whirling about within the furnace chamber 1 the ash is thrown in a molten state against the walls 4 of that chamber, flows down these walls and across the bottom thereof and passes through opening 24 into slag duct 25 from where the ashes are removed in a manner well known in the art.

In accordance with the invention any ash particles which still remain in the gases that leave through the gas outlet 3 are carried in a substantially straight upward flow path into the upper portion of radiant chamber 2. In this portion a temperature prevails which is below the ash fusion point of the fuel. Consequently these ash particles are cooled sufficiently so that they solidify before touching the walls of radiant chamber 2 or convection heating surfaces 26 and 27 located in the upper part of the furnace and in the gas passage beyond. Accumulation of slag on these surfaces is therefore avoided, thereby eliminating frequent costly shutdown of the power plant for cleaning purposes.

Although in the illustrative embodiment of the invention a natural circulation steam generator has been described it is understood that the invention can equally well be applied to a forced circulation or controlled circulation steam generator with comparative beneficial results. Furthermore the invention can also be applied to a heat exchanger heating air or other gases instead of steam and a heat exchanger in which ash forming fuels other than pulverized coal are burned.

Finally the invention can be applied also with great advantage to a furnace in which firing takes place under a static pressure higher than atmospheric pressure.

I claim:

1. In a cyclone type furnace for burning ash forming fuel and for producing molten ash, said furnace having an annular combustion space, an axial cylindrical gas outlet throat of substantial length extending downwardly into said annular combustion space, said cylindrical throat having an inside diameter substantially smaller than the outside diameter of said annular combustion space, fuel burning means for discharging fuel and air tangentially into said annular space, and a molten ash outlet in the lower portion of said cyclone chamber, the combination of gas flow straightening vanes in said axial cylindrical gas outlet throat, said straightening vanes having a radially extending continuous surface the depth of which gradually increases with the height of said axial cylindrical gas outlet throat as said continuous vane surface advances from a point adjacent the lower periphery of said outlet throat upwardly throughout a major portion of said throat's height, and an axially open gas passage defined by the inside edge of said straightening vanes being spaced a substantial distance from the vertical axis of said throat.

2. In a furnace for burning ash forming fuel and for producing molten ash, said furnace having an axially elongated cyclone chamber including an annular combustion space, a radiation chamber arranged above said cyclone chamber, an axial cylindrical gas outlet duct located within and extending downwardly into said annular combustion space a substantial distance and communicating with said radiation chamber, said cylindrical duct having a diameter substantially smaller than the outer diameter of said annular combustion space, fuel burning means for discharging fuel and air tangentially into said annular space, and a molten ash outlet in the lower portion of said cyclone chamber, the combination of gas flow straightening vanes in said axial cylindrical gas outlet duct, said straightening vanes having a radially extending continuous surface the depth of which gradually increases with the height of said axial cylindrical gas outlet duct as said continuous vane surface advances from a point adjacent the lower inner periphery of said outlet duct upwardly throughout a major portion of said duct's height, and an unrestricted open gas passage bounded by the inside edge of said straightening vanes being spaced a substantial distance from the vertical axis of said duct.

3. In a furnace, the combination as defined in claim 2 in which the walls of said annular combustion space and of said axial cylindrical gas outlet duct are lined with fluid cooled tubes.

4. The method of operating a slagging cyclone furnace having an annular combustion space surrounding an axial gas outlet duct of substantially smaller cross-sectional area and having a slag outlet removed therefrom, comprising the steps of introducing into said annular combustion space in a generally tangential direction streams of fuel and air; burning said fuel thereby producing a stream of rotating combustion gases having molten ash particles suspended therein; separating by centrifugal force a majority of the molten ash particles contained in said rotating combustion gases, removing by gravity through said slag outlet said molten separated ash; drawing said rotating gases towards and into said axial gas outlet duct to produce a gas stream flowing at relatively higher velocity; substantially maintaining the flow area and axial velocity of said gas stream throughout the length of said outlet duct; opposing and retarding the rotation of said gases within said length of the duct, while the flow area and axial velocity of the gases is thus maintained, by obstructing said rotating gas flow at circumferentially spaced locations within a peripheral zone adjacent the inner surface of said outlet duct; gradually extending the range of said obstructing action in directions toward the central axis of said duct said range progressing as the flow of said gases progresses within said duct toward the outlet thereof to induce a flow of said gases and of the molten ash particles retained therein toward the central axis of said duct; limiting the progress of said range toward the central axis to retain an axial column of undisturbed rising gases into which the gases from the peripheral zone together with the molten ash particles retained therein tend to flow by virtue of the lower flow resistance encountered in said axial column, whereby said rotational motion is converted into a substantially straight line motion within said peripheral zone by a progressing, gradual arresting action upon the gases causing the molten ash particles remaining in suspension in the gases to follow a substantially straight path when leaving said duct; and progressively enlarging the flow area and reducing the flow velocity of said gases after the gases leave said axial gas outlet duct.

References Cited in the file of this patent

UNITED STATES PATENTS

| | | |
|---|---|---|
| 2,660,996 | Wasp et al. | Dec. 1, 1953 |
| 2,739,878 | Jolley | Mar. 27, 1956 |
| 2,827,022 | Krause et al. | Mar. 18, 1958 |

FOREIGN PATENTS

| | | |
|---|---|---|
| 564,409 | Germany | Nov. 18, 1932 |
| 710,848 | Great Britain | June 16, 1954 |
| 1,058,176 | France | Mar. 15, 1954 |